Figure 1:
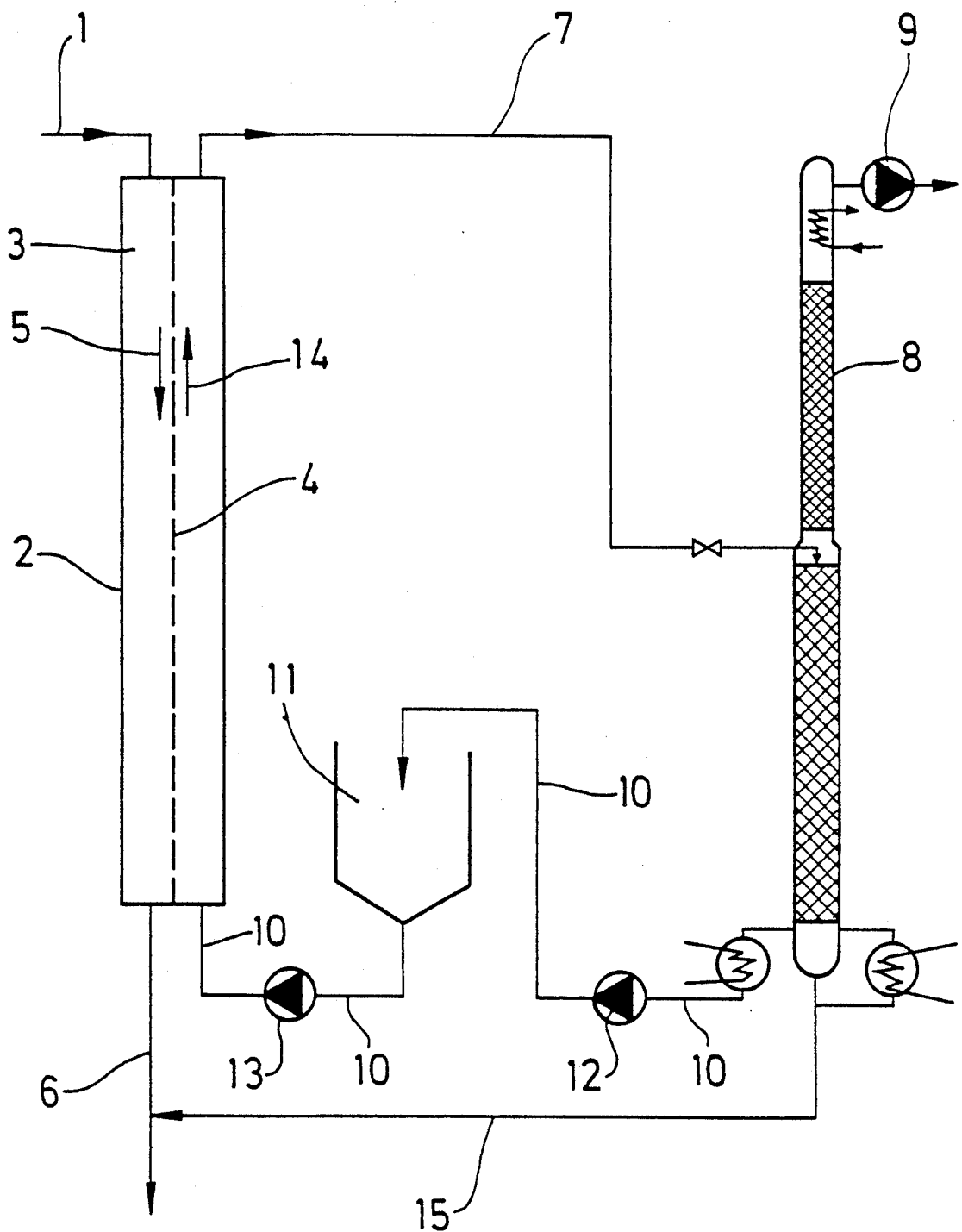

United States Patent [19]

Gresch

[11] Patent Number: 4,988,525
[45] Date of Patent: Jan. 29, 1991

[54] PROCESS FOR SELECTIVE REMOVAL OF VOLATILE SUBSTANCES FROM LIQUIDS, AS WELL AS UNIT AND DEVICE FOR CARRYING OUT THE PROCESS

[75] Inventor: Walter Gresch, Niederweningen, Switzerland

[73] Assignees: Bucher-Guyer AG Maschinenfabrik, Niederweningen, Switzerland

[21] Appl. No.: 358,345

[22] PCT Filed: Aug. 24, 1988

[86] PCT No.: PCT/CH88/00145
§ 371 Date: Apr. 26, 1989
§ 102(e) Date: Apr. 26, 1989

[87] PCT Pub. No.: WO89/01965
PCT Pub. Date: Mar. 9, 1989

[30] Foreign Application Priority Data
Aug. 28, 1987 [CH] Switzerland .......................... 3328/87

[51] Int. Cl.⁵ .......................... A23L 2/30; C12L 1/00
[52] U.S. Cl. .......................... 426/493; 426/490; 426/492; 210/195.2; 210/321.6; 210/240; 210/641
[58] Field of Search .......................... 426/490, 492, 493; 210/644, 651, 195.2, 321.6, 321.75, 321.79, 240, 641

[56] References Cited

U.S. PATENT DOCUMENTS

| | | | |
|---|---|---|---|
| 4,610,887 | 9/1986 | Galzy et al. | 426/490 |
| 4,626,437 | 12/1986 | Schobinger et al. | 426/494 |
| 4,717,482 | 1/1988 | Light | 210/651 |
| 4,724,080 | 2/1988 | Dau et al. | 210/651 |
| 4,778,688 | 10/1988 | Matson | 426/492 |
| 4,804,554 | 2/1989 | Barth | 210/651 |

FOREIGN PATENT DOCUMENTS

| | | |
|---|---|---|
| 0229335 | 7/1987 | European Pat. Off. |
| 8202405 | 7/1982 | World Int. Prop. O. |
| 8702380 | 4/1987 | World Int. Prop. O. |

Primary Examiner—Donald E. Czaja
Assistant Examiner—Helen Pratt
Attorney, Agent, or Firm—Edmund M. Jaskiewicz

[57] ABSTRACT

For selective removal of volatile substances from liquids, the initial liquid is fed to a crosscurrent diaphragm separation device (2), in which the permeate consisting of water and volatile substances is separated by increased transdiaphragm pressure and concentration difference. Then, the permeate is fed into a further liquid-volatile separation device (8), in which the alcohol is distilled out. The permeate now only consisting of water, salts, acids and extracts is then fed back into the crosscurrent diaphragm separation device (2), where it flows through the permeate side in countercurrent to the flow of the retenate. Excess permeate can be introduced into the dealcoholized initial liquid. By the process according to the invention the economic efficiency of the unit and the quality of the end product are significantly improved.

26 Claims, 5 Drawing Sheets

PROCESS FOR SELECTIVE REMOVAL OF VOLATILE SUBSTANCES FROM LIQUIDS, AS WELL AS UNIT AND DEVICE FOR CARRYING OUT THE PROCESS

The invention relates a process for selective removal of volatile substances from liquids, particularly of alcohol from beverages such as wine, beer or fermented fruit juices by diaphragm separation processes and at least one additional separation process.

In the dealcoholization of liquids one distinguishes between alcohol reduction (for example 40 %) and total dealcoholization (0.5%). In the process the characteristic taste substances in the initial liquid, for example wine or beer, are to remain as unaltered as possible in the dealcoholized beverage.

To attain this goal, thermal processes have become known which have been developed from evaporating units. A known unit for the extraction of alcohol-free wine exhibits a multi-stage evaporator, in which the alcohol is evaporated along with the aromatic substances. The condensate is fed to a distilling column with several separation substances, in which the alcohol is distilled out. Afterwards the separated aromatic substances are again mixed with the dealcoholized wine. The disadvantage of the known thermal processes lies in that as a result of thermal stress boiling products which diminish taste are produced and an undesirable aftertaste occurs in the dealcoholized beverage. Moreover the energy use in thermal processes is very high and the unit, particularly with the use of several evaporation stages and a distilling column with several separation stages, is relatively expensive.

In addition diaphragm separation processes for dealcoholization of liquids have become known, in which the alcohol is filtered out of the initial liquid, for example, beer or wine by reverse osmosis in the crosscurrent diaphragm process. With the addition of water the liquid to be dealcoholized is fed through the diaphragm filter modules with the help of a circulating pump. In the course of this the volatile substances are removed by diafiltration along with the water on the permeate side of the diaphragm filter module. To improve the yield a reconcentration or preconcentration of the retentate is often also carried out. Since in these known diaphragm processes there is no heat treatment, the peculiar taste or boiled taste resulting in thermal processes is not present. But with increasing concentration, the aromatic substances contained in the initial liquid still diffuse through the diaphragms of the diaphragm filter module, particularly if the diaphragm is not precisely adjusted to the initial liquid. The consequence of this is a taste alteration of the beverage, which becomes worse with increasing dealcoholization. This leads to wine, for example, losing its characteristic taste in total dealcoholization by diaphragm filtration.

A further known process of dealcoholization of liquids is the dialysis process (EP-OS 0021247). In contrast to the reverse osmosis processes, in which the transdiaphragm pressure works as a driving force for the permeate flow through the diaphragm, in the dialysis process the separation of the alcohol from the initial liquid results almost exclusively from the concentration differences of the two liquids separated by a diaphragm. The initial liquid to be dealcoholized flows through the retentate side of the dialysis module. On the permeate side water is fed through the dialysis module countercurrent to the retentate flow. As a result of the concentration differences the volatile substances (alcohol) pass out of the retentate through the diaphragm and are carried off along with the water on the permeate side as dialyzate. In a similar manner as in reverse osmosis, with the diffusion of the alcohol other low molecular substances, particularly aromatic substances, pass through the diaphragm into the dialyzate. In the production of alcohol-reduced beverages these aromatic losses have no significant impact on the general character of the beverage. In contrast with total dealcoholization by dialysis, the taste and full-bodied character of the initial product suffer significantly. In addition the small specific yield of the unit given by the action principle declines with significantly increasing reduction of the alcohol content and the energy use rises correspondingly. The dialysis process is therefore unsuited for total dealcoholization;

Further a process for dealcoholization of wine has become known, which consists of a combination of dialysis processes and thermal processes. The wine as initial liquid flows through the retentate side of the dialysis module and as result of the concentration differences gives off the alcohol off through the diaphragm to the dialyzate, which flows through the permeate side of the dialysis module countercurrent to the retentate flow. The dialyzate is fed into a distilling column, in which a further separation of the alcohol from the dialyzate takes places by vacuum distillation at low temperature. The valuable substances remaining in the recirculating dialyzate as a result cause an only slight concentration difference with the retentate, so that after a certain start-up time and reaching of equilibrium essentially only alcohol diffuses from the retentate into the dialyzate and a considerable portion of the valuable substances remains in the retentate. The disadvantage of this process lies in that as a result of the dialysis the yield goes down significantly with increasing alcohol reduction, so that in total dealcoholization the profitability of the unit is no longer guaranteed.

Theretofore the object of the invention is to avoid the disadvantages attached to the known processes for dealcoholization of liquids, and to improve the economic efficiency of the unit and the quality of the product not only in the case of alcohol reduction but also in total dealcoholization.

This object is achieved according to the invention in that the permeate consisting mainly of water and volatile substances is separated from the initial liquid by increased transdiaphragm pressure, in comparison with the dialysis process, and by concentration difference, subsequently the alcohol is removed by at least one additional liquid-volatile separation process, and then the resulting residue is fed back at least partially into the permeate side circuit between diaphragm separation processes and at least one of the additional liquid-volatile separation processes.

Additional advantageous and suitable configuration of the invention can be gathered from the claims.

The advantages obtained with the invention consist particularly in the fact that the disadvantages of the known processes can be largely eliminated while maintaining their advantages by the combination according to the invention of reverse osmosis, dialysis and thermal processes. The crosscurrent diaphragm separation device according to the invention is constructed so that the liquid-volatile separation takes place through the diaphragm by increased transdiaphragm pressure relative to the dialysis and by concentration difference. The driving force in this is the transdiaphragm pressure, which significantly improves the given small yield in the pure dialysis process and sharply reduces the yield decrease resulting from the increasing alcohol reduction. A further advantage consists in the fact that the aromatic substances, salts, acids and extracts passing through the diaphragm along with the alcohol remain in the permeate after the removal of the alcohol by at least one additional liquid-volatile separation process, for example, thermal distillation, diaphragm processes and a part of the permeate is fed back again into the retentate. Thereby the original taste and bouquet substances contained in the initial liquid, for example wine, are preserved largely unchanged even in total dealcoholization.

Figure 2:
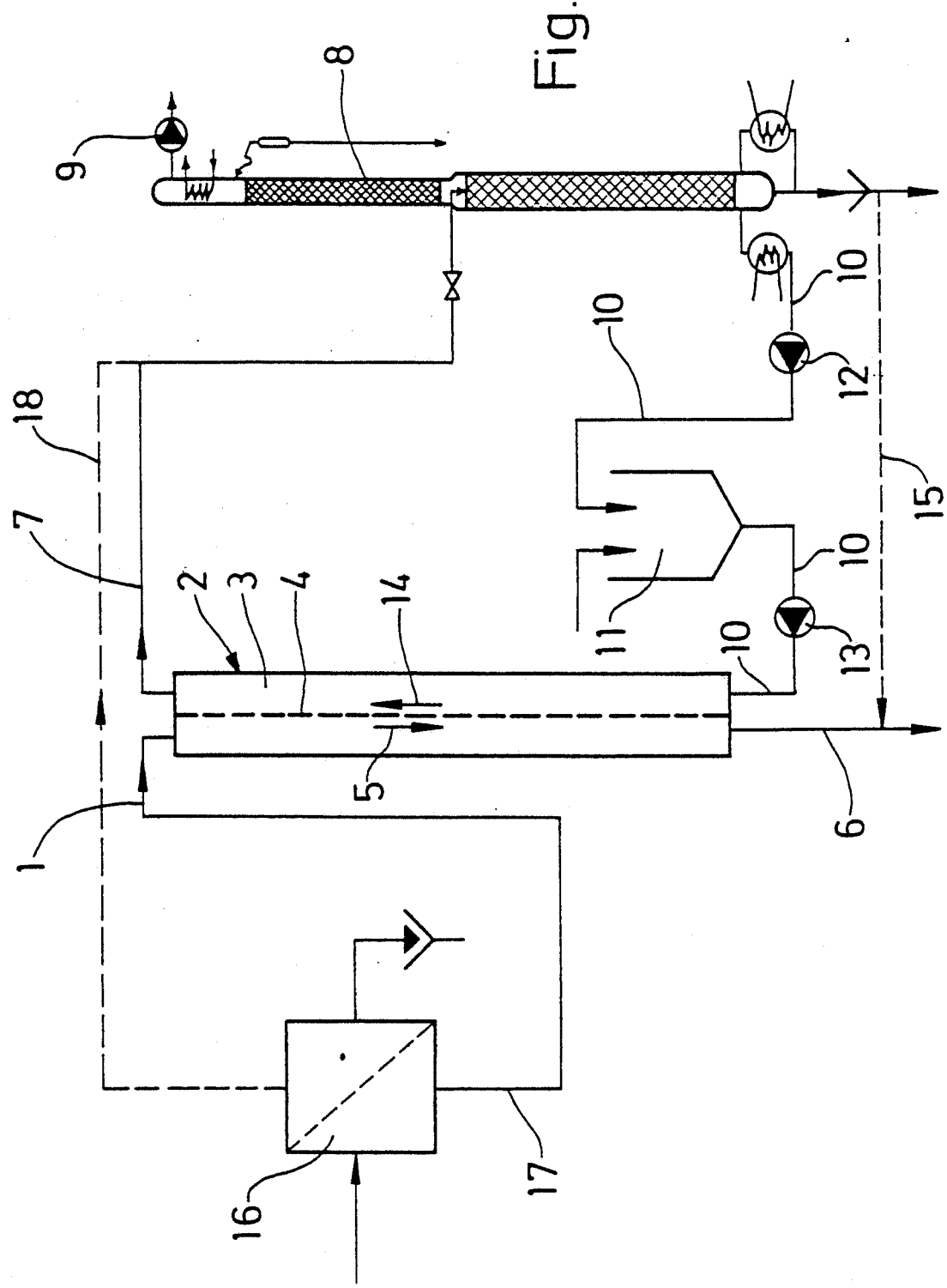
Figure 3:
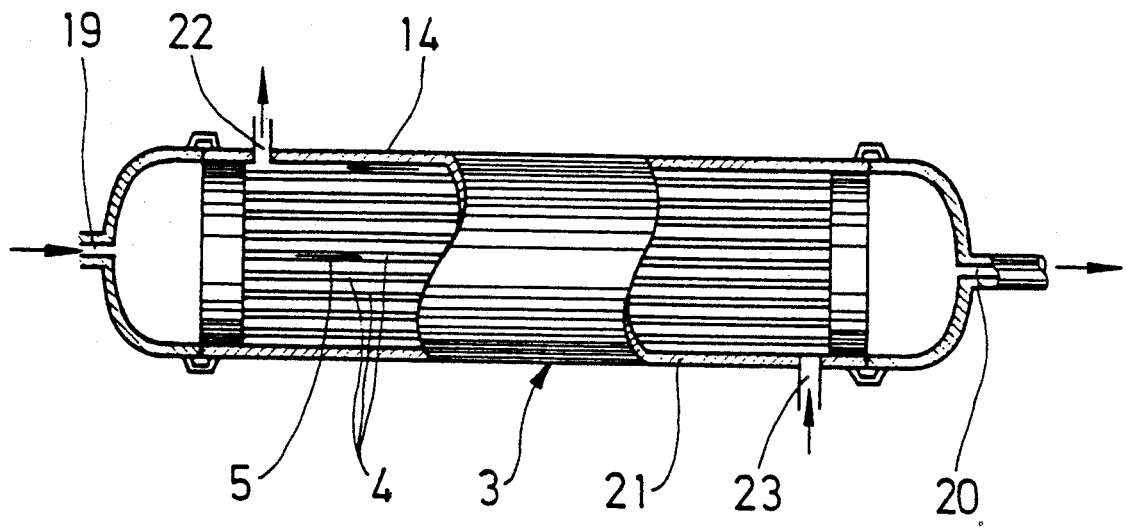
Figure 4:
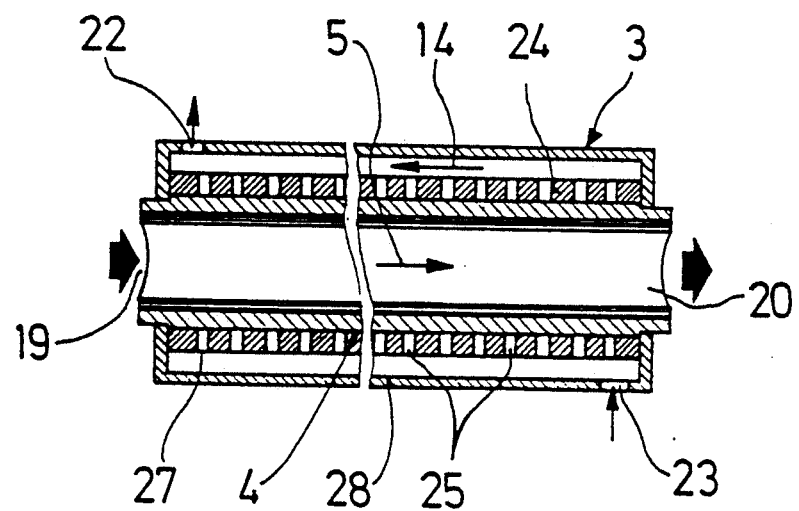
Figure 5:
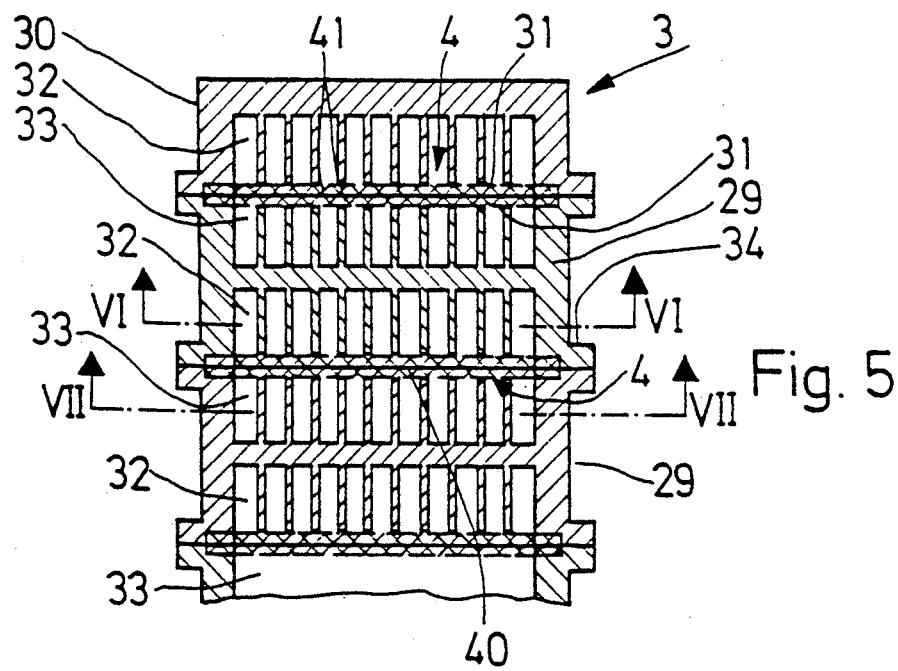
Figure 6:
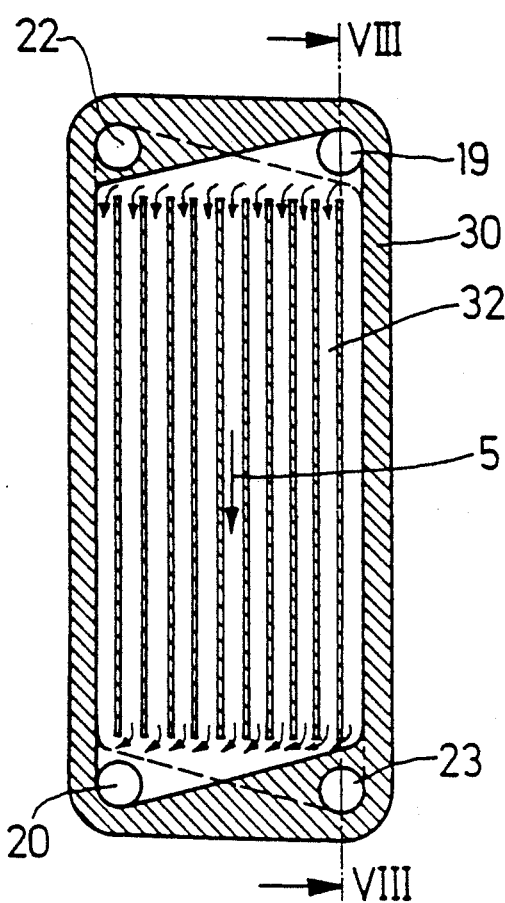
Figure 7:
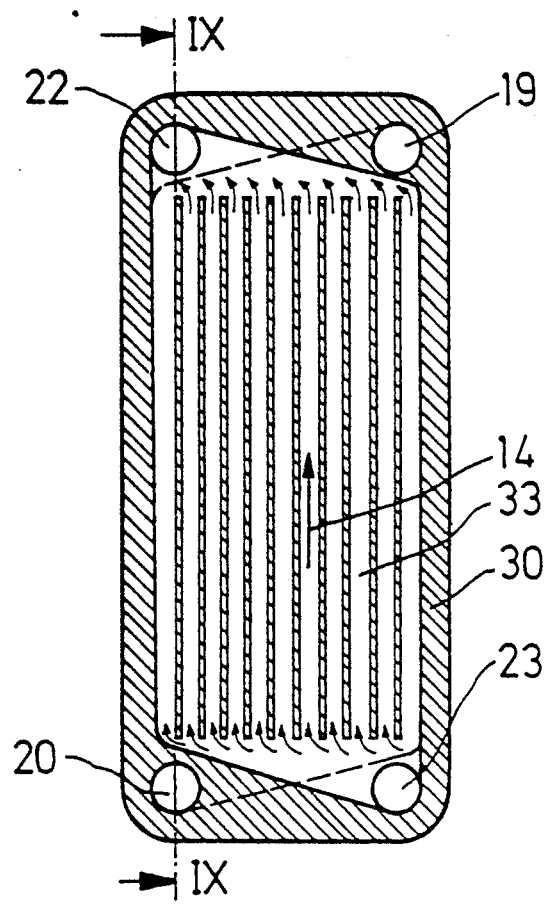
Figure 8:
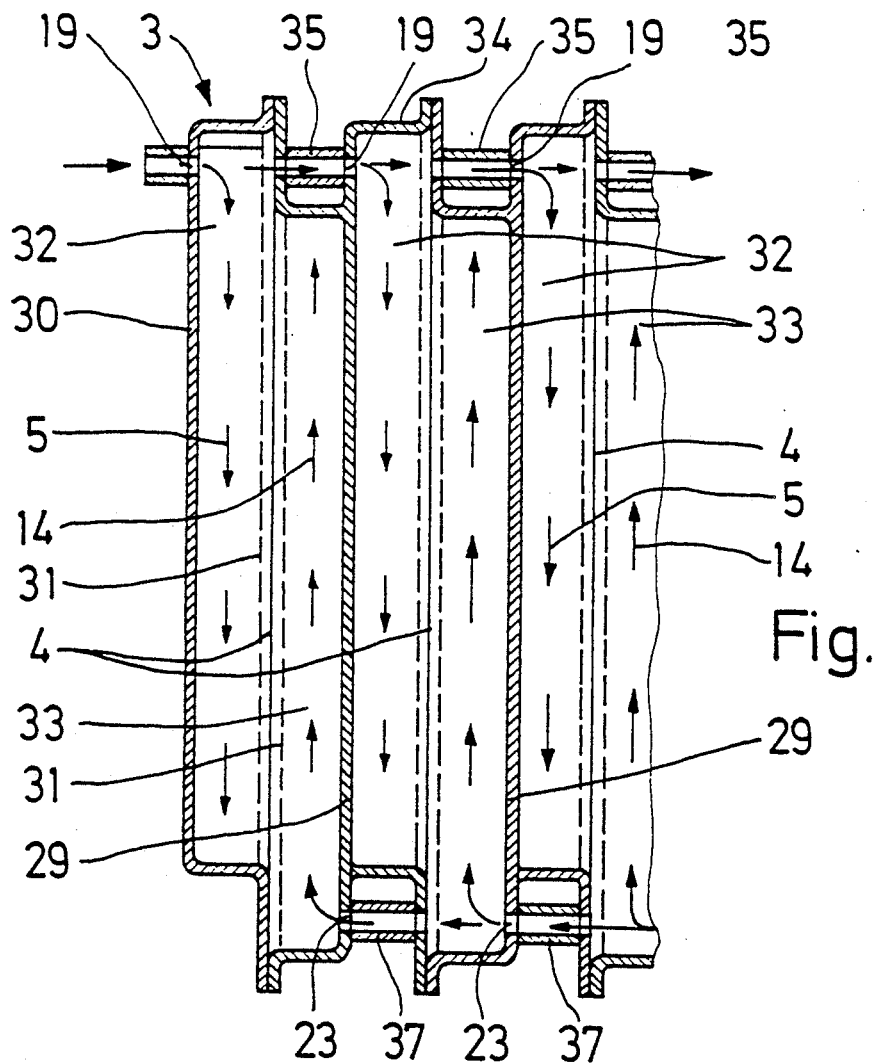
Figure 9:
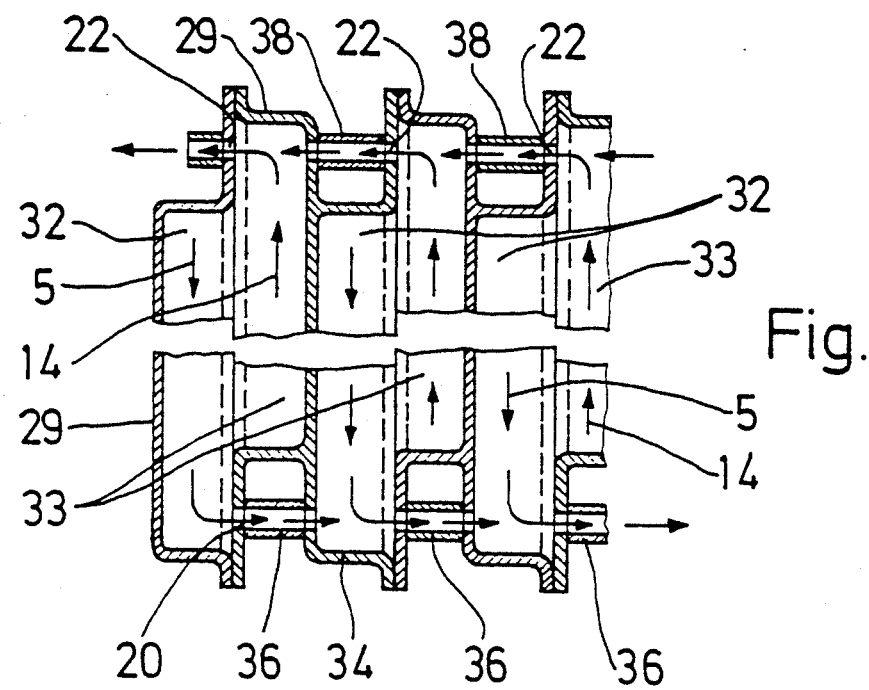

The invention is explained in more detail in the following description and the drawing which represents different embodiments. There are shown in:

FIG 1. a diagrammatic representation of the unit according to the invention,

FIG. 2 the unit according to FIG. 1 with a reverse osmosis device connected upstream for preconcentration of the initial liquid, FIG. 3 a longitudinal section through a hollow fiber reverse osmosis module modified according to the invention, FIG. 4 a longitudinal cross section through a reverse osmosis pipe module modified according to the invention, FIG 5. a cross section through several reverse osmosis plate modules strung together that are modified according to the invention, FIG. 6 a section through the reverse osmosis plate module according to line VI—VI in FIG. 5, FIG. 7 a section according to line VII—VII in FIG. 5, FIG. 8 a section through the reverse osmosis plate module according to line VIII—VIII in FIG. 6 and FIG. 9 a section according to line IX—IX in FIG. 7.

In the embodiment according to FIG. 1 the wine to be dealcoholized is introduced by a feed pipe 1 into the retentate side of a countercurrent diaphragm separation device 2. Crosscurrent diaphragm separation device 2 consists of one or more crosscurrent diaphragm modules 3, in which mainly alcohol and water are removed from the wine as well as first, unwelcome, in addition aromatic substances, salts, acids and extracts to an extent not to be ignored. The specific design of crosscurrent diaphragm modules 3, which cause a liquid-volatile separation on the basis of the transdiaphragm pressure and concentration difference, is described later. In crosscurrent diaphragm module 3 the wine flows through the retentate side separated from the permeate side by a diaphragm 4 in the direction of arrow 5 and leaves crosscurrent diaphragm module 3 after separation of the volatile substances as dealcoholized or alcohol-reduced wine by discharge pipe 6. The permeate consisting of alcohol, water and also aromatic substances, salts, acids and extracts is introduced by way of a permeate discharge pipe 7 into a further liquid-volatile separation device 8, which in the embodiment consists of a distilling column. In the distilling column the alcohol is distilled out of the permeate at low temperatures, which are made possible by a vacuum pump 9. By a return pipe 10 and a buffer tank 11 the residue consisting of aromatic substances, salts, acids and extracts is fed back again into diaphragm module 3 of crosscurrent diaphragm separation device 2. Circulating pumps 12 and 13 see to it that the permeate flows through the permeate side of crosscurrent diaphragm module 3 in the direction of arrow 14 countercurrent to the flow of the retentate.

Although diaphragm 4 is selectively chosen for the separation of alcohol, by reason of the initial concentration difference between retentate and permeate, at first along with the alcohol and water also aromatic substances, salts, acids and extracts from the wine pass into the permeate. With increasing concentration of these substances which remain after separation of the alcohol in the liquid-volatile separation device, the concentration difference decreases, so that after reaching equilibrium the above mentioned valuable substances now diffuse only to an insignificant extent into the permeate and are thereby contained in the dealcoholized wine. The effect is improved by addition of aromatic substances, salts, acids and extracts which correspond to the contents of wine, to buffer tank 11 and/or into connecting pipes 10 and/or pumps 12, 13. These substances can also be extracted by enrichment by distillation or diaphragm processes from the recirculating permeate or excess permeate or can also be mixed together synthetically.

Diaphragm module 3 is operated with increased transdiaphragm pressure, which is over 5 bars. The driving force for the diffusion of alcohol is thus less the concentration difference between retentate and permeate than primarily the pressure, which is necessary to overcome the osmotic counterpressure of the alcohol. The osmotic counterpressure of salts, acids, extracts and aromatic substances increases with increasing concentration in the permeate, so that compared with pure reverse osmosis fewer valuable substances are lost and after a certain start-up time essentially only alcohol still diffuses into the permeate.

From liquid-volatile separation device 8 a connection pipe 15 leads to discharge pipe 6 for the retentate. Through connection pipe 15 excess permeate, after passage through liquid-volatile separation device 8 is fed to the dealcoholized wine, which is thereby additionally enriched with valuable substances. With increasing transdiaphragm pressure the amount of permeate rises. As a consequence more permeate must be carried off as excess by connection pipe 15. As a result, the concentration of the permeate fed back by return pipe 10 decreases in proportion to the concentration in the retentate. As a result, the concentration gradient rises and thus also the quantity which diffuses from the retentate into the permeate. The valuable substances in the excess permeate are not present in equal quality as originally in the wine, as a result of the thermal stress, slight as it is, in liquid volatile separation device 8 embodied as a distilling column. Therefore one must optimize between yield and quality, particularly, when one is working without addition of aromatic substances, salts, acids and extracts to the recirculating permeate. It has turned out that with a transdiaphragm pressure in the range of 5 to 25 bars a high quality with significantly increased throughput is attained compared with the pure dialysis process. With addition of aromatic substances, salts, acids and extracts to the recirculating permeate the permissible pressure for reverse osmosis systems can be exploited and thus additional improvement of the yield along with good quality is attained.

With lesser alcohol reduction, for example to 50% of the original content, one can dispense with feeding the excess permeate back to the wine when quality demands are lower. Instead, beverage thinning water can be supplied to the retentate before its entry into crosscurrent diaphragm separation device 2. The result of this is that while using the same unit a less mild distillation can be carried out, which leads to increased yield and savings in energy costs.

Along with the separation of undesired volatile substances, for example alcohol from liquids, the process according to the invention can be used to advantage for the separation of valuable volatile substances, for example aromatic substances from liquids. In the first case diaphragm 4 of crosscurrent diaphragm module 3 must exhibit a high salt retention capacity, while in the extraction of aromatic substances the salt retention capacity ought to be a low as possible. With corresponding lay out it is therefore possible by switching the crosscurrent diaphragm modules to use the same unit during the harvest season for aroma recovery and after the season for dealcoholization of fermented fruit juices. In comparison with purely thermal aroma recovery the quality if significantly improved with the process according to the invention, since no thermal separation of the aromatic components from the fruit juice takes places, but rather a cold separation. Through this multiple use of the unit according to the invention its economic efficiency is substantially improved, which is not possible with the known systems.

If the process according to the invention is used for the extraction of a concentrated, dealcoholized liquid, it is suitable to connect upstream to countercurrent diaphragm separation device 2 an ordinary reverse osmosis device 16 for preconcentration of the initial liquid, for example raw juice (FIG. 2). The preconcentration in this instance preferably takes place only to the extent that the losses in aroma which thereby result are insignificant. The raw juice, which is preferably already clarified by an ultrafiltration or microfiltration device connected upstream, not represented, is fed to reverse osmosis device 16 and reconcentrated. The concentrate is fed by pipe 17 into the retentate side feed pipe 1 of crosscurrent diaphragm separation device 2. With a preconcentration of about 50% and a relatively high transdiaphragm pressure of crosscurrent diaphragm separation device 2 a quality improvement is attained with high throughput. The reason for this is that with preconcentration by reverse osmosis device 16 only slight losses of valuable substances occur, however a sharp decrease in the quantity of permeate in dealcoholization takes place, and thereby a decrease in excess permeate. This in turn results in an increased concentration of valuable substances when the permeate is fed back into crosscurrent diaphragm separation device 2.

When there is high preconcentration in reverse osmosis device 16 it is advantageous, because of the higher losses in valuable substances which result thereby, to feed a part of the permeate by way of pipe 18 into permeate discharge pipe 7 of crosscurrent diaphragm device 2. It has turned out that by preconcentration by reverse osmosis device 16, crosscurrent diaphragm separation device 2 can be built significantly smaller for dealcoholization or aroma recovery and consequently subsequent liquid-volatile separation device 8 can be built smaller. The ultrafiltration or microfiltration device connected upstream to reverse osmosis device 16 forms the prerequisite for clean juices, to be able to use, instead of pipe modules, also more cost-effective non-pipe modules, for example hollow fiber, roll or plate modules, for preconcentration by reverse osmosis device 16.

In FIG. 3 of the drawing an embodiment of crosscurrent diaphragm module 3 for crosscurrent diaphragm separation device 2 is represented in the form of a modified hollow fiber reverse osmosis module. Crosscurrent diaphragm module 3 exhibits on its forward front side an intake opening 19 for the initial liquid to be dealcoholized, which forms the retentate. On the opposite front side is located an outlet opening 20 for the retentate, which flows through a hollow fiber body of crosscurrent diaphragm module 3 forming diaphragms 4 in direction of arrow 5. In one casing 21 surrounding diaphragms 4 of crosscurrent diaphragm module 3 there is located near of intake opening 19 a permeate outlet opening 22, which is connected with permeate discharge pipe 7 of crosscurrent diaphragm separation device 2. On the opposite end of crosscurrent diaphragm module 3 in casing 21 there is placed a permeate intake opening 23, which is connected with return pipe 10 of crosscurrent diaphragm separation device 2. The permeate coming out on the outside of diaphragm 4 accumulates in the space between diaphragm outside and casing 21 and flows through the permeate side of crosscurrent diaphragm module 3 in direction of arrow 14 with the help of circulating pumps 12 and 13 countercurrent to the flow of the retentate.

A further embodiment of crosscurrent diaphragm module 3 for crosscurrent diaphragm separation device 2 is represented in FIG. 4 in the form of a modified reverse osmosis pipe module. An inner pipe 24 of crosscurrent diaphragm module 3 exhibits along with diaphragm 4 intake opening 19 and outlet opening 20 for the retentate. The wall of inner pipe 24 is provided with flow-through openings 25 for diaphragm 4, through which the permeate can flow and is collected in the space between inner pipe 24 and a casing pipe 28 surrounding the inner pipe. Tubular casing 28 exhibits near intake opening 19 outlet opening 22 for the permeate. On the other end of crosscurrent diaphragm module 3 there is located in tubular casing 28 intake opening 23 which is connected with return pipe 10 of crosscurrent diaphragm separation device 2. With the help of recirculating pumps 12 and 13 the permeate flows through the space between tubular casing 28 and outer pipe 26 in direction of arrow 14 in countercurrent to the flow of the retentate.

FIGS. 5 through 9 show as a further embodiment of crosscurrent diaphragm module 3 a reverse osmosis plate module, which consists of plate element 29 and end plate 30, between which diaphragm 4 supported by support elements 31 and consisting of separation diaphragm 40 and support diaphragm 41 is placed. End plate 30 exhibits a space 32 for the retentate and plate element 29 a space 33 for the permeate. Spaces 32 and 33 are separated from one another by diaphragms 4 and the retentate and the permeate flow through them in opposite directions.

Plate element 29 exhibits on its back side an attachment 34, to which a further plate element 29 can be attached. By diaphragm 4 placed between the two plate elements 29 there result further spaces 32 and 33, through which the retentate or the permeate flows (FIGS. 6 and 7, arrows 5 and 14).

From FIG. 6 in connection with FIGS. 8 and 9 it can be seen that space 32 exhibits, on its upper right end, intake opening 19 for the retentate and, on its lower left end, outlet opening 20 for the retentate. FIG. 7 shows in connection with FIGS. 8 and 9 that in space 33 on the lower right end there is located permeate intake opening 23 and on the upper left end permeate outlet opening 22.

When several plate elements 29 are strung together intake openings 19 and outlet openings 20 of individual spaces 32 for the retentate are connected with one another by pipes or passages 35 (FIG. 8) and 36 (FIG. 9). The connection of permeate intake openings 23 and of permeate outlet openings 22 of individual spaces 33 occurs in each case by pipes or passages 37 (FIG. 8) and 38 (FIG. 9).

I claim:

1. Process for selective removal of volatile substances from liquids including alcohol from wine, beer and fermented fruit juices by diaphragm separation processes and at least one additional separation process, the steps comprising subjecting the liquid to a diaphragm separation process in which a transdiaphragm pressure is increased beyond that of a dialysis process such that a permeate consisting mainly of water and volatile substances is separated from the liquid by the increased transdiaphragm pressure and the difference in concentrations, subjecting the permeate to a liquid-volatile separation process to remove a volatile substance therefrom, and feeding back at least partially a residue resulting from the liquid-volatile separation process into the permeate side of the diaphragm separation process.

2. Process according to claim 1, wherein the permeate flows countercurrent to the retentate in the course of the separation by increased transdiaphragm pressure and by concentration difference and the driving force for the liquid-volatile separation is mainly an increased transdiaphragm pressure.

3. Process according to claim 1 wherein the diaphragm separation process works in terms of diaphragm technology according to the reverse osmosis process.

4. Process according to claim 1 wherein the transdiaphragm pressure is more than 5 bars.

5. Process according to claim 1 wherein accumulating excess permeate is fed to the initial liquid which has been dealcoholized.

6. Process according to claim 1 wherein the aromatic substances, salts, acids and extracts which penetrate the diaphragm in the diaphragm separation process are enriched by separation processes such as distillation, ion exchangers or diaphragm processes before being fed back into the permeate circuit or in that corresponding substances are added to the permeate circuit from the outside.

7. An apparatus for the selective removal of volatile substances from liquids, including alcohol from wines, beer and fermented fruit juices, comprising a counter flow diaphragm separation device having a retentate side and a permeate side, said diaphragm separation device having an increased transdiaphragm pressure greater than that of a dialysis process so that a permeate consisting mainly of water and volatile substances is separated from the initial liquid by the increased transdiaphragm pressure and a difference in concentration between the retentate and permeate sides, a feed pipe connected to said retentate side through which an initial liquid is supplied, a discharge pipe connected to said retentate side through which at least partially dealcoholized initial liquid is removed, a permeate discharge pipe leading from said permeate side, a liquid-volatile separation device connected to said permeate discharge pipe, a return pipe connected between said liquid-volatile separation device and the permeate side of said diaphragm separation device through which at least a portion of the residue resulting in the liquid-volatile separation device is fed back into said permeate side.

8. Unit according to claim 7, wherein crosscurrent diaphragm separation device (2) is equipped with reverse osmosis diaphragms.

9. Unit according to claim 7 wherein additional liquid-volatile separation device (8) consists of a distilling column.

10. Unit according to claim 7 wherein permeate side return pipe one or more circulating pumps are placed between additional liquid-volatile separation device and crosscurrent diaphragm separation device.

11. Unit according to claim 10 wherein additional aromatic substances, salts, acids and extracts which at least approximately correspond to the contents of wine are brought into the buffer tank or tanks or connecting pipes (10) and/or into circulating pumps.

12. Unit according to claim 11, wherein the additional aromatic substances, salts, acids and extracts are extracted from the recirculating permeate or the excess permeate through enrichment by distillation or diaphragm processes.

13. Unit according to claim 7 wherein at least one buffer tank is assigned in permeate discharge pipe and/or in permeate side return pipe.

14. Unit according to claim 7 wherein by a pipe excess permeate is introduced from additional liquid-volatile separation device into retentate side discharge pipe of crosscurrent diaphragm separation device.

15. Unit according to claim 7 wherein the retentate side feed pipe is connected with a reverse osmosis device known in the art connected upstream from the crosscurrent diaphragm separation device, in which the initial liquid is preconcentrated, before it is fed to the crosscurrent diaphragm separation device.

16. Unit according to claim 15, wherein a part of the permeate is introduced into the reverse osmosis device connected upstream by way of a pipe into the permeate discharge pipe of crosscurrent diaphragm separation device and fed to liquid-volatile separation device.

17. Unit according to claim 15 wherein an ultrafiltration or microfiltration device is connected upstream to reverse osmosis device for the clarification of the initial liquid.

18. Device according to claim 7 wherein countercurrent diaphragm separation device consists of at least one crosscurrent diaphragm module, which on the retentate side exhibits an intake opening and an outlet opening for the retentate and the recirculating permeate flows through the permeate side of crosscurrent diaphragm module by way of an intake opening and an outlet opening countercurrent or in crosscurrent to the retentate flow.

19. Device according to claim 18, wherein the intake opening for the retentate and the outlet opening for the permeate are placed in flow-through direction in the area of the last third of the one end and outlet opening for the retentate and intake opening for the permeate in the area of the last third of the other end of crosscurrent diaphragm module.

20. Device according to claim 18 wherein intake opening for the retentate is connected with feed pipe and outlet opening with discharge pipe of the retentate and outlet opening for the permeate is connected with permeate discharge pipe and intake opening with return pipe of the permeate side circuit.

21. Device according to claim 18 wherein intake openings and outlet openings are interchangeable for reversing retentate and permeate.

22. Device according to claim 18 wherein crosscurrent diaphragm module is a hollow fiber, pipe or plate module.

23. Device according to claim 18 wherein crosscurrent diaphragm module is equipped with reverse osmosis diaphragms.

24. Device according to claim 18 wherein an inner pipe serving to support diaphragm of crosscurrent diaphragm module made as a reverse osmosis pipe module, exhibits a high density corresponding to a porosity of more than 5% on radial passage openings for the permeate and intake and outlet openings for the permeate circuit are placed at the end of the reverse osmosis pipe module in a tubular casing surrounding inner pipe.

25. Device according to claim 18 wherein crosscurrent diaphragm module shaped as a reverse osmosis module plate exhibits two spaces separated by diaphragm, and in space on the upper end in one corner there is located intake opening is located and on the lower end in the opposite corner outlet opening for the retentate and the permeate intake opening in the space is placed on the lower end in the corner on the same side of retentate intake opening and permeate outlet opening on the upper end in the opposite corner of space.

26. Device according to claim 25, wherein on stringing together several crosscurrent diaphragm modules, spaces in the area of intake openings are connected to one another by passages and in the area of outlet openings for the retentate by passages and spaces in the area of permeate intake openings and of permeate outlet openings by passages.

* * * * *